June 10, 1930.  G. B. ARONES  1,763,290

DEVICE FOR FEEDING CUTTING COMPOUNDS AND THE LIKE

Filed Nov. 12, 1928

INVENTOR
G. B. ARONES
BY
ATTORNEY

Patented June 10, 1930

1,763,290

UNITED STATES PATENT OFFICE

GEORGE B. ARONES, OF MINNEAPOLIS, MINNESOTA

DEVICE FOR FEEDING CUTTING COMPOUNDS AND THE LIKE

Application filed November 12, 1928. Serial No. 318,929.

This invention relates to devices for feeding oil or water, or other so-called cutting compounds, to the cutting tools of milling machines and the like, and the primary object is to provide a device which will feed small streams of the liquid to the various cutting tools, and in which the spacing between the streams may be changed to correspond to the spacing between the various cutting tools of the machines, which tools are subject to adjustment with respect to each other depending upon the piece of work to be cut. Further and more specific objects will be disclosed in the course of the following specification, reference being had to the accompanying drawings, wherein:

Figure 1:
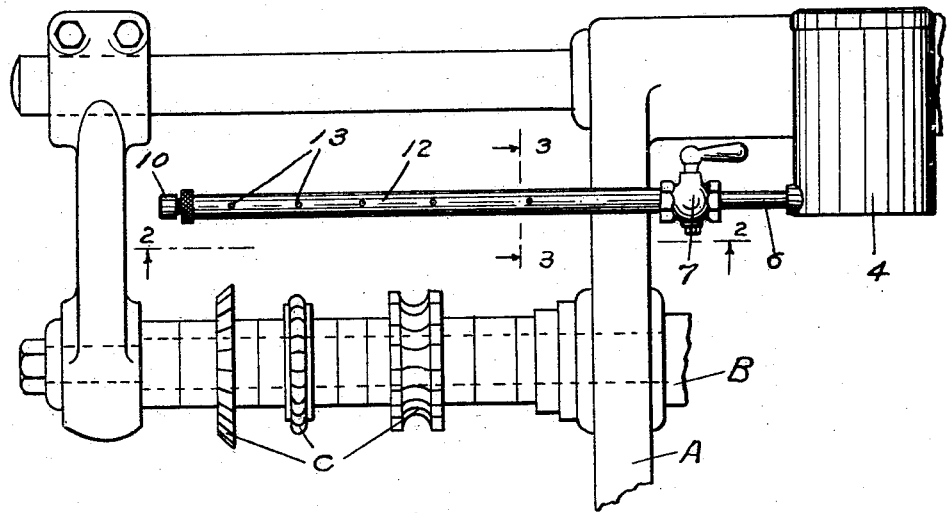
Fig. 1 is an elevation of a portion of a milling machine showing the milling tools thereof, and illustrating the position and arrangement of my improved feed device.

Referring to the drawing more particularly and by reference characters, A designates a portion of a frame in which a shaft B is journaled and which shaft carries the cutters C, of a milling machine, all of common and well known construction. To lubricate and keep the cutters C cool it is necessary to supply them with oil or water, or prepared compounds, all of which are in a liquid state and are most efficiently employed when fed in continuously running small streams to the individual cutting tools. Heretofore this has been done by hand, or by crude make-shift devices.

In the present instance I provide a container 4, for the liquid, and this communicates with a feed pipe 5 through a tube 6 and a valve 7, it being understood that the entire feeding mechanism may be mounted in any suitable manner on the machine. The pipe 5 is provided along its bottom with a longitudinally extending slot 8. The end of the pipe opposite from the valve 7 is provided with threads 9 upon which is secured a cup 10. Upon the threads 9 is also secured a knurled adjusting nut 11, between which and the valve 7 is disposed a sleeve 12. This sleeve is rotatable on the pipe 5 when the nut 11 is released, but is held against rotation when the nut is tightened against it.

Figure 2:
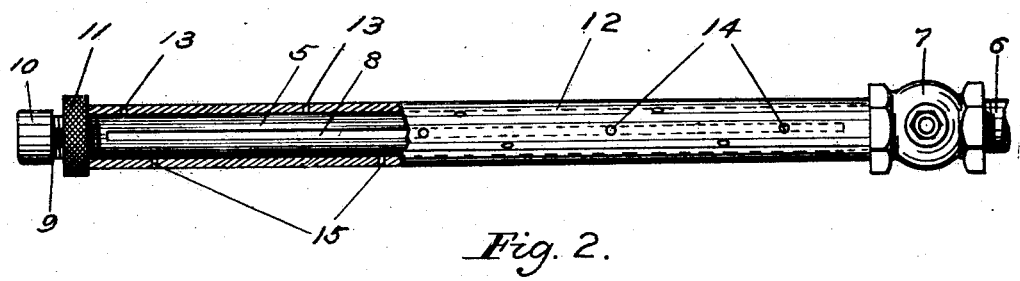
Fig. 2 is an enlarged detail view, partly in section, of the feed unit proper, as seen on the line 2—2 in Fig. 1.
Figure 3:
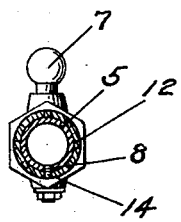
Fig. 3 is an enlarged detail section on the line 3—3 in Fig. 1.

The sleeve 12 is provided with annularly spaced series of longitudinally extending rows of perforations 13, 14 and 15, and the perforations in each row are spaced differently than are those in any other row. As shown in Fig. 2 the sleeve 12 has been secured with the row of perforations 14 registering with the slot, and consequently these holes will permit the escape of the liquid to the work at corresponding intervals. When work is being done which requires greater or lesser spacing between the cutting tools it is only necessary to release the nut 11, and turn the sleeve until the desired perforation spacing is registered with the slot 8. The tube or sleeve 12 may of course have a large number of rows of perforations, so that a number of cutting conditions can be accommodated, and if no suitable feed arrangement is found in the sleeve it is a simple matter to substitute the sleeve with another in which different arrangements and combinations of feed holes are found.

It is understood that suitable modifications may be made in the general design and structural details of the invention as herein shown, provided, however, that said modifications come within the spirit and scope of the appended claims.

Having now therefore fully shown and described my invention, what I claim to be new and desire to protect by Letters Patent is:

1. A feed unit of the character described, comprising a feed pipe having a longitudinally extending slot, a sleeve member rotatably disposed upon the pipe and having spaced series of perforations adapted to be selectively registered with the slot, and means at one end of the unit for releasably securing the sleeve against rotation on the pipe, said means comprising a member threaded upon the pipe for abutting engagement against the sleeve.

2. A feed unit of the character described, comprising a feed pipe having a longitudinally extending slot, a sleeve member rotatably disposed upon the pipe and having spaced series of perforations adapted to be selectively registered with the slot, a stop element at one end of the pipe, and a nut screwing upon the other end of the pipe to releasably clamp the sleeve in adjusted positions between the nut and stop member.

In testimony whereof I affix my signature.

GEORGE B. ARONES.